Feb. 13, 1951 F. A. HESTER ET AL 2,541,060

TONE AND DENSITY COMPENSATING DEVICE

Filed May 18, 1948 3 Sheets-Sheet 1

FRANK A. HESTER
JOHN W. SMITH
*INVENTOR.*

BY Alfred W. Barber

Feb. 13, 1951 F. A. HESTER ET AL 2,541,060

TONE AND DENSITY COMPENSATING DEVICE

Filed May 18, 1948 3 Sheets-Sheet 2

FRANK A. HESTER
JOHN W. SMITH
*INVENTOR.*

BY Alfred W. Barber
*ATTORNEY*

Feb. 13, 1951 F. A. HESTER ET AL 2,541,060

TONE AND DENSITY COMPENSATING DEVICE

Filed May 18, 1948 3 Sheets-Sheet 3

FRANK A. HESTER
JOWN W. SMITH
*INVENTOR.*

*BY* Alfred W. Barber
*ATTORNEY*

Patented Feb. 13, 1951

2,541,060

UNITED STATES PATENT OFFICE 2,541,060

TONE AND DENSITY COMPENSATING DEVICE

Frank A. Hester, New York, and John W. Smith, Whitestone, N. Y., assignors to Faximile, Inc., New York, N. Y., a corporation of Delaware Application May 18, 1948, Serial No. 27,646

7 Claims. (Cl. 332—3)

The present invention relates to electrical recorders, in particular, to means and methods of tone scale control and copy tone correction in transmitters and electrolytic recorders and similar devices.

In facsimile scanners, and the like, subject copy, or an original, consisting of graphic material, text, and half-tone material such as pictures, is scanned with a small spot of light and the resulting variation in the reflected or transmitted light, produced by variations in the density of the elemental areas making up the original, are transformed into electrical signal variations. One normal method of using these electrical variations is to have them modulate a subcarrier signal in a balanced modulator, which subscarrier signal in turn modulates a radio transmitter or is directly transmitted by wire. The intelligence is thus transferred to a distant point and recorded on a recording scanner by reproducing the signal variations, in either positive or negative phases, point by point or line by line in synchronism with the transmitting equipment. A true facsimile is produced when the density variations of the reproduction bear a definite relationship to the density variations on the original. An original consisting of black and white subject matter, such as textual matter or line drawings, is very easily transmitted and reproduced since the recorded density is either minimum or maximum, depending upon whether the point being scanned is white or black. However, because the electrical signals are directly used to produce the reproductions, when the original is of a half-tone nature, the equipment being used must be capable of producing electrical signals which vary linearly in their relative intensity in the same manner as the variations in subject density (the logarithm of the ratio of the reflected to the incident light). In other words, the system of scanning and conversion of light signal variations into electrical signals must produce linear electrical variations for logarithmic light variations. The present invention is concerned with a method of assuring that the electrical variations correspond to the light variations in the above mentioned manner.

In any system wherein a signal source is used to modulate a subcarrier signal in a balanced modulator circuit, which modulated signal is in turn used to modulate the carrier signal of the transmitter, there are problems which arise in simultaneously controlling (1) the variations in the intensity of the signal as received from the signal source and (2) the balance point of the balanced modulated circuit. In facsimile transmission of one type, this problem is a particular concern since it is therein common to have the subcarrier modulated from zero output for signals corresponding to one density, to a predetermined output for the signals corresponding to the contrasting density. Thus, in the facsimile system described herein, the system is adjusted so that a signal representative of white will not produce a subcarrier output, whereas a signal representative of black will produce a full subcarrier signal. Therefore, it is necessary to have the same input signal strength for the balanced modulator circuit for all facsimile signals of the same type, regardless of the nature of the original subject matter being used. This invention is also concerned with a method of maintaining such constancy, though the original subject matter scanned may produce varying electrical signal strengths in the photoelectric conversion system for similar shading effects.

It was stated above that it is essential that the apparatus for converting light variations into electrical variations should be capable of producing linear electrical signal functions representing the logarithmic light variations. It is equally essential, when certain types of originals are being scanned, and corrective measures would improve their quality, to have some means of varying the linearity of signal conversion so that densities of one type may be distorted to produce an overall reproduction that is of a better density contrast than the original. A situation of this type arises when an original having a dull white is being scanned or, of an opposite nature, an original having a dull black is being scanned. In the one case it is desirable to have the dull white changed to a pure white signal, in the other case it is desirable to have the dull black density intensified to a pure black signal. In between the dull white and the dull black there may be variations of white or black in the original which would classify the subject matter as inferior but, if varied in a certain manner, the contrast range between black and white could be changed to improve the quality of the original in any reproduced copy. This invention is also concerned with a method of controlling the conversion of the reflected light signals into electrical signals so that such corrective measures may be made.

Thus, it is one object of the present invention to provide a method of and means for simply and semi-automatically modifying input signals of varying characteristics so that they will comply with the predetermined characteristic requirements of the remainder of the circuit system and function in a predetermined manner.

Another object of the present invention is to provide a system for translating the density variation in original subject matter into electrical signals linearly related thereto and for compressing either end of the electrical signal scale.

Another object is to provide a system wherein the variations in the quality of black and white densities, between originals being scanned, will have little or no effect on the signals transmitted or the reproduction signals received at the receiver, the reproduction being of at least standard quality in spite of deficiencies in the original.

Still a further object is to provide a system for semi-automatically expanding or contracting portions of the scale in order to compensate for deficiencies in the tone scale of the original.

A still further object is to accomplish the above named objects in a system embodying a balanced modulator and, at the same time, to provide a simple and simultaneous method and means for effecting the desired setting and for maintaining the balance in the modulator system.

A still further object is to adjust the quality of white to conform with any predetermined white standard while at the same time keeping the linearity of response over the entire tonal range from white to black in conformance with a standard response, solely by varying the photocell sensitivity.

These and other objects of the present invention will be apparent to those skilled in the art from the detailed description of the inventions given in connection with the various figures of the drawing.

Figure 1:
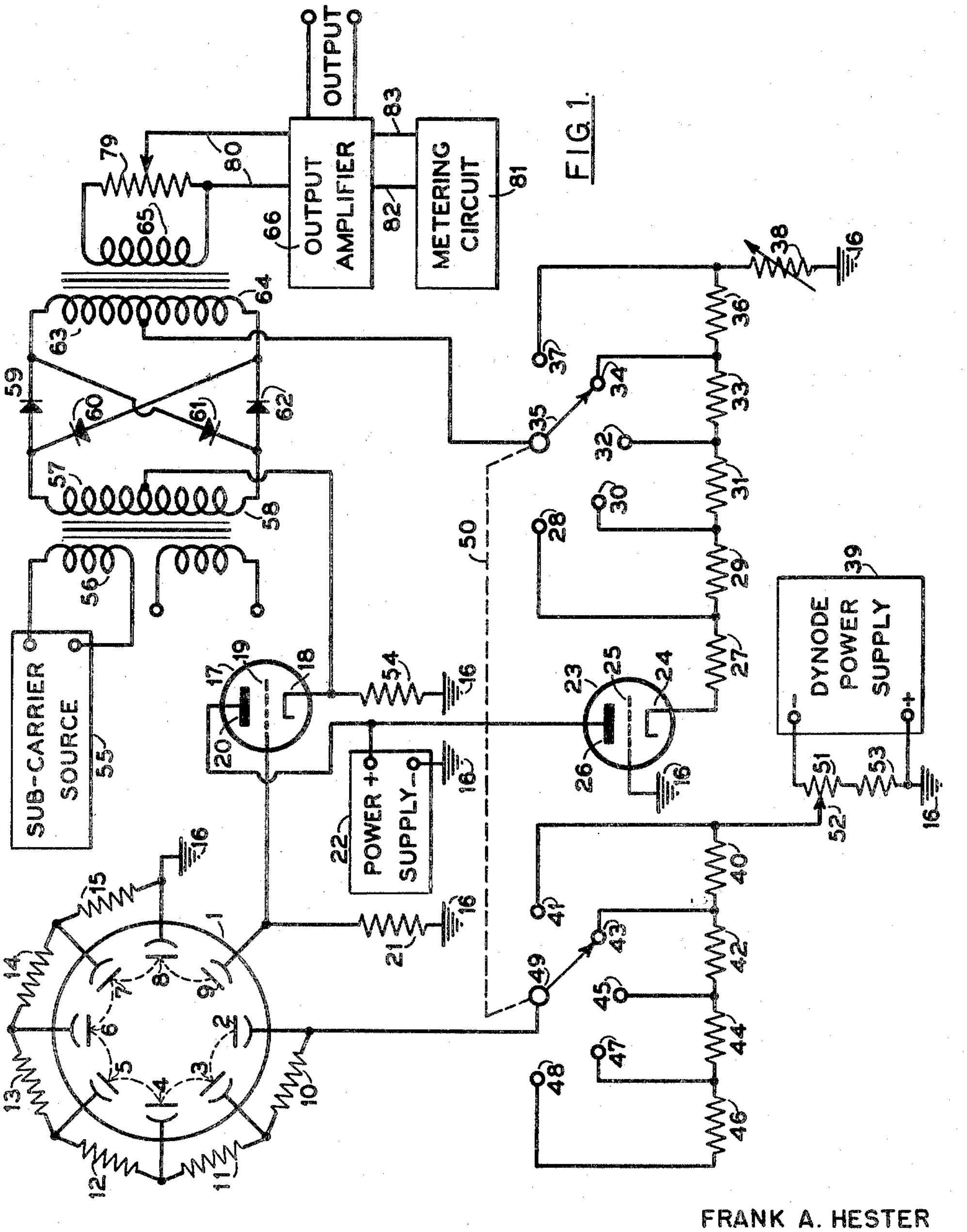
Fig. 1 shows a simplified circuit diagram of one embodiment of the present invention.
Figure 2:
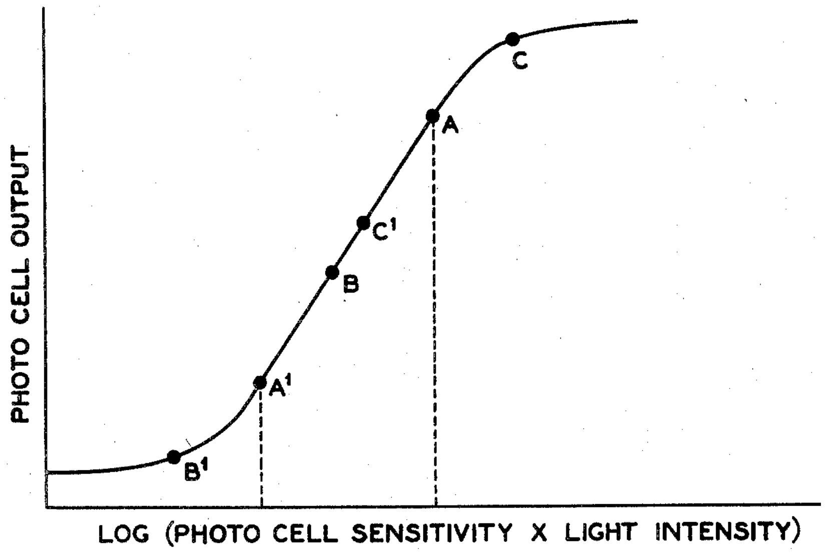
Fig. 2 shows a response curve characteristic of the photocell scanner used in the present invention.

In Fig. 2 there is plotted a representative curve of photocell output voltage against the logarithm of the product of photocell sensitivity multiplied by light intensity. To establish this curve, many photocells were tested for the purpose of determining the changes in output characteristics of a photocell, having generally a logarithmic type of output, when the input light intensity is varied or the biasing voltages on the dynodes are varied. Circuits of the type used for obtaining logarithmic photocell outputs are fully described in the patent application of Frank A. Hester, entitled, "Logarithmic Circuit" filed in the Patent Office March 22, 1946, and bearing Serial No. 656,216. It was found that, for any output value of the photocell circuit, one variable, say light intensity, could be varied to change the output of the cell, and the dynode biasing voltage could be varied to cancel out the effect of the change in light intensity, thus bringing the output voltage back to the original value. Over the normal range of the photocell, Fig. 2 demonstrates that it is possible to overcome any sensitivity or light intensity variation, by a dynode biasing voltage change. Further, a curve of photocell output versus the logarithm of light intensity is demonstrated to have the same shape or character, independent of the dynode biasing voltage. Thus, all characteristic regions in the curve, such as bends, knees and changes of slope, occur at the same output voltages, and are independent of photocell sensitivity. It was found that, in a circuit of the type shown in Fig. 1, point A on the curve of Fig. 2 being a voltage of approximately 0.6 volt, the path A—A′ was the best operational portion of the curve for standard operating conditions, when linearity of reproduction was desired. Normally, when the electrical signal scale of any original subject matter is adjusted to cause the scale to fall between A and A′, the best conversion conditions are obtained. If the photocell dynode biasing voltages are adjusted so that the cell operates along a different path of operation, say from C to C′, there is a distortion or bunching effect of the white, and near white values, with respect to the black and shaded areas of the original being used. Similarly, photocell constants may be varied to place the operational path of the cell along the B to B′ path producing similar results on the lower end of the scale. It can easily be seen that if an original, having what might be called standard white and standard black, is used to obtain the points A and A′, another original with a white portion of a higher intensity, thus producing a higher signal voltage, would cause the operational portion of the curve to fall between C and C′, thereby producing distortion and non-linearity. Or, if an original is employed in which the white value is of a duller shade than the one used for the standard mentioned above, the path of operation might be B—B′, producing distortion of the shaded and black portions of the subject matter, if they are correspondingly dark. As stated above, it is found desirable to be able quickly and simply to adjust the photocell output so that any subject matter will produce signals along any predetermined desired portion of the curve. In Fig. 1 a system and a circuit for simultaneously making these adjustments and obtaining balance in the balanced modulator, at the desirable points, is shown.

In Fig. 1, the reflected light or light transmitted through the copy of subject matter being scanned acts upon electron multiplier photocell 1, so as to produce a signal across resistor 21, which signal determines the voltage on grid 19 of cathode follower 17. Electron multiplier photocell 1 has a cathode 2 and accelerator dynodes 3, 4, 5, 6, 7 and 8 and finally dynode 9. Each of these dynodes, except for dynode 9, is maintained at a correspondingly higher voltage by means of potentials derived from dynode power supply 39 and at a voltage determined by the relative values of bleeder resistors 10, 11, 12, 13, 14 and 15. Final collector dynode 9 is maintained at the same "no-signal" bias voltage as dynode 8 by connecting it through load resistor 21 to ground 16. As described in the patent application referred to above, the voltage developed across resistor 21, due to light variations impinging upon cathode 2, will bear a logarithmic relation to those light variations and will, therefore, function linearly. The voltage developed across the resistor 21 is applied to grid 19 of cathode follower 17, which has plate 20 at a suitable positive potential and cathode 18 connected through resistor 54 to ground 16. The signal on grid 19 produces a corresponding voltage across resistor 54 which is applied to the centerpoint of the balanced modulating transformer network made up of windings 56, 57, 58, 63, 64 and 65. The input circuit of the balanced modulator is a transformer coupled to subcarrier source 55, and the output is coupled to load resistor 79. The center tap of the primary of the balanced modulator output transformer is connected to the cathode circuit of cathode follower 23. The subcarrier voltage to be modulated is supplied by subcarrier source 55 through winding 56. Balanced modulation is achieved by means of the switch-connected rectifiers 59, 60, 61 and 62. The manner in which this modulator operates is set forth in Patent No. 2,313,583 issued to Hugh C. Ressler on March 9, 1943. A direct current voltage, to balance the steady state or white signal voltage across resistor 54, is supplied through the center tap of windings 63 and 64 from the cathode circuit of the balance tube 23. Balance tube 23 has cathode 24, heated by a conventional means not shown, control grid 25, connected to ground 16, and plate 26 connected to a suitable positive potential source such as 22. The constants of the balanced modulator are such that it is balanced to produce no output in the output circuit when a standard white signal is being used or scanned by photocell 1, or a voltage of approximately 0.6 volt is developed across resistor 21, when contact arm 35 is resting on switch point 32. Variable contact 35 makes contact with fixed contacts 28, 30, 32, 34 and 37 and is in turn connected to the center tap of transformer winding 63 and 64 in the balanced modulator. The load resistor 79 is part of a potentiometer and, by means of wire leads 80, is connected to amplifier 66. The output of amplifier 66 may be connected over leads 82 and 83 to a metering device 81. The white balance control, or dynode biasing voltage, for photocell 1 is connected to variable contact 49 which contact makes contact with fixed contacts 41, 43, 45, 47 and 48. Contacts 41, 43, 45, 47 and 48 are at respectively higher potentials across resistors 40, 42, 44 and 46. Contact 41, and the lower end of resistor 40, are connected to variable contact 52 which in turn is adjustable along resistor 51. Resistors 51 and 53 are connected as a load circuit across power supply 39, with the lower end of resistor 53 being connected to ground 16. Variable contact 49, acting with contacts 41, 43, 45, 47 and 48, permits the application to the dynodes of photomultiplier 1 of any predetermined bias voltage. Potentiometer 52—51 permits a fine adjustment of the dynode bias settings. The voltage developed across resistor 54 determines the status of operation of the balanced modulator and is representative of the electrical signal voltage developed by the photomultiplier tube. The point of balance in the balance modulator circuit is determined by the position of variable contact 35 with respect to fixed contacts 28, 30, 32, 34 and 37. These fixed contacts are tapped positions across the cathode resistor of cathode follower 23, which cathode resistor consists of resistor elements 27, 29, 31, 33, 36 and variable resistor 38, the latter being connected to ground 16.

The principal control of the fixed circuit constants is variable resistor 38, since it has a vernier control over the amount of balance voltage required to balance the modulator circuit. Preliminary to all transmission or operation, resistor 38 is adjusted to effect balance in the modulator when a voltage of 0.6 volt is obtained across resistor 21, with variable contact 35 set on fixed contact 32. This setting, when once made, is only reset when some of the circuit components are changed. It is not an operational adjustment but a factory or engineering adjustment.

To operate, if an original requiring no corrective measures is being used, gang switch 50 is set so that contact 49 is in contact with contact 45 and contact 35 is connected to contact 32. If an output signal is produced, when white is being viewed by the photocell, potentiometer 52—51 is varied to give a no-output condition, as measured by metering circuit 81. Having obtained a no-output signal for white, the amount of signal desired for full black is set by adjusting potentiometer 79 when the photocell is viewing black of the subject matter. Having thus established the extremes of voltage variation, values of light density in between black and white will have corresponding voltage values. Thus, it is seen that the only operating adjustments required to effect linear conversion of light signals to electrical signals, and to adjust the electrical signals so that all white signals produce balance in the modulator, are the setting of gang switch 50, and the adjustment of white balance control 52—51, and black level control potentiometer 79.

It was stated above, in the description of Fig. 2, that the preferable path of operation along Fig. 2 is from A to A'. Such a path of operation will produce linear electrical signal variations with negligible bunching or distortion. It was also stated that the path of operation depended upon a number of variables, one being the dynode biasing potentials of the photomultiplier 1. The switch 50, ganged to operate variable contacts 49 and 35 so that they will make contact with a set of fixed contacts, determines the photomultiplier biasing voltage and the balance modulator voltage respectively for different conditions of operation. As described above, when contact 49 is in contact with contact 45, and 35 is in contact with contact 32, the conditions for standard operation are established. If, as described under Fig. 2, it is desirable to operate along the path C—C', or B—B', of the sensitivity curve of the photocell, for the purpose of effecting some correction of the subject matter being scanned, then gang switch 50 is set so that contacts 49 and either 41 or 43 and contact 35 and either 37 or 34 are connected, if the subject matter is of a very high contrast and low density. The selection of either contact 34 or 37, and 41 or 43, will depend upon the amount of corrective measure desired. Similarly, if the subject matter is predominantly dark and of low contrast, gang switch 50 is adjusted so that contact 49 will make contact with contacts 48 or 47 and contact 35 with contacts 28 or 30, depending upon the amount of corrective measure desired. The interaction of the dynode biasing, or white balance switch, having variable contact 49, and the balanced modulator potential control, with variable contact 35, produces a proper balanced modulator potential for each bias setting. In all situations, gang switch 50 selects the predetermined path of operation and variable potentiometer 51—52 makes the vernier adjustment to produce a result of no-output voltage for the white signal being used.

Prior to the present invention, though there were methods of varying the dynode potential in the photomultiplier, and methods of varying the balance modulator voltage in a balanced modulator, as well as means of employing a photomultiplier output in a balanced modulator circuit, there was no easy, semi-automatic and predetermined means of determining what position along the photomultiplier characteristic curve the system would operate while still maintaining proper balance voltage in the balance modulator circuit. The present invention sets forth a method of and means for adjusting the photomultiplier dynode biasing potential and balanced modulator potential so that any one of a number of pre-set conditions can be repeated, regardless of what type of original subject matter is being employed, so as to produce reproductions with continuing good fidelity. All of this is done simply by operating gang switch 50 to select the type of reproduction that is desired, and varying potentiometer 51—52 to adjust the white signal output to the balance voltage circuit. Thus, by solely varying photocell sensitivity, the present invention achieves, simply, results obtained in the prior art only by the use of many and varied controls.

Figure 3:
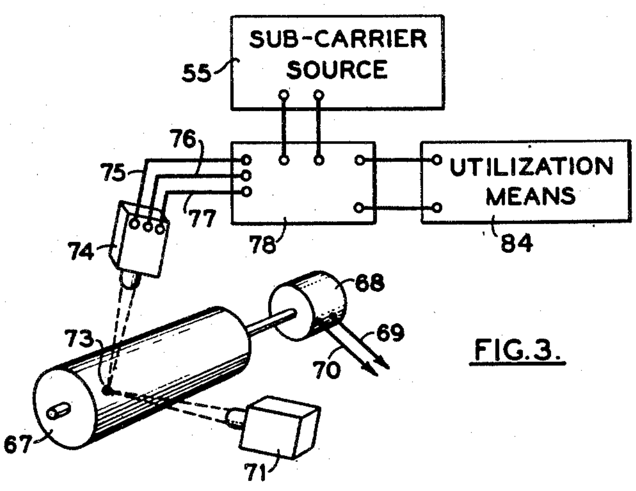
Fig. 3 shows a simplified drawing of a facsimile scanner embodying the present invention.

Fig. 3 shows, in simplified form, one form of a complete facsimile scanner and transmitter utilizing the present invention. The facsimile scanner includes a copy drum 67 driven by a suitable motor 68, light from the light source 71 illuminating scanning spot 73, and a photoelectric device, as described in Fig. 1, contained in unit 74. The photoelectric device in unit 74 is connected by wires 75, 76 and 77 to unit 78, which includes the balanced modulator, power supplies and control mechanism described in Fig. 1. Subcarrier source 55 is shown and the modulated output of unit 78 is applied to utilization means 84 wherein the load resistor, amplifier and metering circuit shown in Fig. 1 are assembled.

Figure 4:
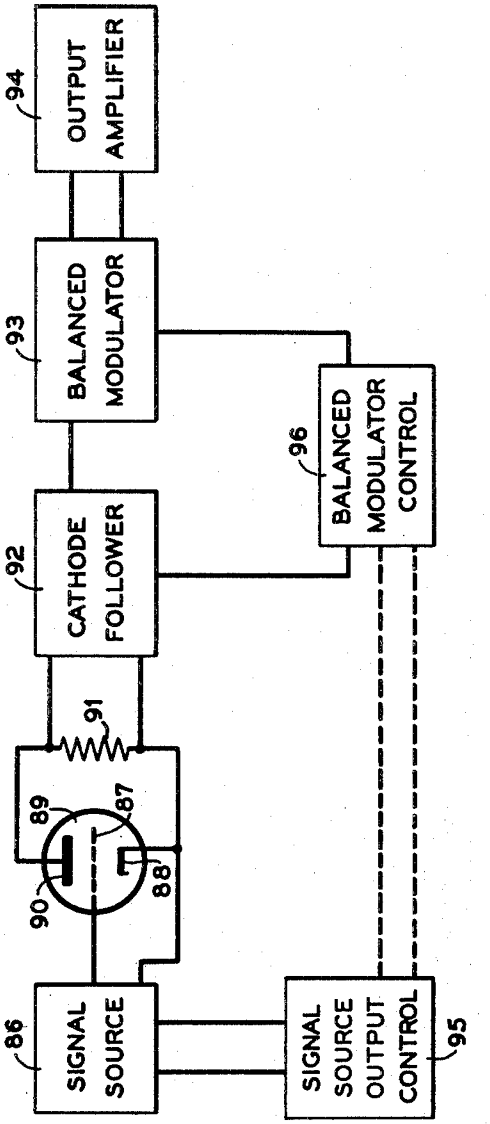
Fig. 4 shows a simplified drawing of another embodiment of the present invention.

Fig. 4 shows a modified embodiment of the present invention as described in Fig. 1. In Fig. 1 a logarithmic photocell circuit, producing linear signals across an output resistor was described. In Fig. 4 a photocell, or other source of similar signals, produces, in signal source 86, normal, unmodified signals that vary exponentially with optical density. These signals are applied across grid 87 and cathode 88 of vacuum tube 89. Plate 90 of vacuum tube 89 is connected through resistor 91 to the cathode 88. Resistor 91 compares with resistor 21 of Fig. 1. The signals produced across resistor 91 are applied to the cathode follower 92, in a manner similar to that shown in Fig. 1 and, as in Fig 1, through cathode follower 92 to balanced modulator 93 and output amplifier 94. The output of the signal source 86 is controlled by control means 95, in any suitable manner. This control may be mechanically coupled to balanced modulator control 96 as in Fig. 1. The operation of this embodiment is similar to that described in Fig. 1, except that the signal output of signal source 86 is exponential in nature and is fed through a logarithmic amplifier consisting of vacuum tube 89 and resistor 91. The resultant output consists of linear signal variations proportional to the density of the subject being scanned. The action of a tube of this type is also completely described in the patent application referred to above. Thus, it can be seen that the present invention can be used with a photocell circuit producing linear signals, as in Fig. 1, or with a photocell circuit producing exponential signals, cooperating with a logarithmic amplifier to produce linear signals, as described in Fig. 4, all of the circuits being employed in accordance with the light density correction and control means described above.

While only two embodiments of the present invention have been shown and described, many variations will be apparent to those skilled in the art within the spirit and scope of the invention as set forth in the appended claims.

What is claimed is:

1. In a system for converting light variations into electric signals, the combination of, a photoelectric device having a response characterized by upper and lower bends separated by an essentially linear region, means for directing light to be converted into said photoelectric device, a source of adjustable bias for setting the path of operation in said photoelectric device, a balanced modulator circuit in which the output signals of said photoelectric device modulate other signals, means for varying the balance voltage of said balanced modulator, last said means being coupled to said means of adjustable bias to simultaneously set the path of operation in said photoelectric device and to produce the proper balance voltage in said balanced modulator circuit for said path of operation.

2. In a signal system, the combination of, a source of input signals, means for varying the signal strength of said input signals, a signal translating circuit the input of which is connected to said source of signals and the output of which is characterized by a curve having linear and nonlinear portions, a source of higher frequency signals, a balanced modulator connected to said source of higher frequency signals and to the output of said signal translating device in which the signals from said translating device modulate the higher frequency signals, means for determining the balance point in said modulator, said means being coupled to the means for varying the signal strength of said input signals so that the position of operation of said input signals on the output curve of said signal translating device and the desired point of balance in said balanced modulator may be simultaneously selected.

3. In a system for converting light variations into electric signals, the combination of, a photoelectric device having a response characterized by upper and lower bends separated by an essentially linear region, means for directing light to be converted into electrical signals into said photoelectric device, a source of adjustable bias for setting the path of operation in said photoelectric device, a balanced tube circuit for receiving said electric signals and means for maintaining said balance with changes in said path of operation, in which at least part of said source of adjustable bias and part of said means for maintaining said balance are mechanically coupled.

4. In a system for converting light variations into electrical signals, the combination of, a photoelectric device having a response characterized by upper and lower bends separated by an essentially linear region, means for directing light to be converted into electrical signals into said photoelectric device, a source of adjustable bias for setting the path of operation in said photoelectric device, a balanced tube circuit for receiving said electric signals and means for maintaining the balance in said balanced tube circuit with changes in said path of operation, a source of high frequency signals, and a balanced modulator circuit coupled to the output of said balanced tube circuit and to said source of high frequency signals in which said signals from said balanced tube circuit modulate said high frequency signals.

5. In a facsimile system, the combination of, a device for converting light variations into electrical signals having a response characterized by upper and lower bends separated by an essentially linear region, means for directing light to be converted into said device, a source of adjustable bias for setting the path of operation in said device, a balanced tube circuit for receiving said electrical signals, means for maintaining the balance in said balanced tube circuit with changes in said path of operation, and a mechanical coupling between at least part of said source of adjustable bias and part of said means for maintaining said balance for the purpose of quickly permitting an adjustment of said bias and an appropriate setting for said means of balance to any desired position on the said path of operation in said device.

6. In a facsimile system, the combination of a light source characterized by variations around a mean value, a bias sensitive device for converting light variations into electrical signals, a source of subcarrier signals, a balanced modulator coupled to said source of subcarrier signals, a balance tube coupled to the output of said bias sensitive device and to the balanced modulator for impressing said electrical signals on the subcarrier frequency in said balanced modulator and thereby modulating said subcarrier by means of said electrical signals, an output amplifier coupled to the output of said balanced modulator circuit, means for varying the bias of said bias sensitive device to maintain the product of said mean light value and sensitivity of said bias device substantially constant, means mechanically coupled with first said means for adjusting the balance voltage in said balanced modulator circuit so as to automatically maintain the proper balance voltage setting for the selected sensitivity setting of said bias device, and means for controlling the output of said amplifier for producing predetermined maximum and minimum output signal strengths for said electrical signals.

7. In a system for converting light variations into electrical signals, the combination of, an electron multiplier photocell including a plurality of dynodes, means for directing light to be converted into said photocell, a source of adjustable bias connected to at least one of said dynodes for controlling the path of operation in said photocell, a source of signals to be modulated, a balanced modulator coupled to said photocell and said source of signals for modulating said signals from said source in accordance with signals from said photocell, a source of adjustable bias for varying the balance voltage of said balanced modulator, the last said bias adjustment being coupled to said first bias adjustment to simultaneously set the path of operation in said photocell and to produce predetermined balance voltages in said balanced modulator.

FRANK A. HESTER.
JOHN W. SMITH.

REFERENCES CITED

The following references are of record in the file of this patent:

UNITED STATES PATENTS

| Number | Name | Date |
|---|---|---|
| 1,738,315 | Ranger | Dec. 3, 1929 |
| 1,988,472 | Artzt | Jan. 22, 1935 |
| 2,083,245 | Shore et al. | June 8, 1937 |
| 2,095,717 | Shore et al. | Oct. 12, 1937 |
| 2,136,606 | Bendel | Nov. 15, 1938 |
| 2,202,629 | Hansell | May 28, 1940 |
| 2,252,752 | Bliss | Aug. 19, 1941 |
| 2,280,303 | Reynolds | Apr. 21, 1942 |